(12) United States Patent
Chamberlain

(10) Patent No.: US 7,078,619 B2
(45) Date of Patent: Jul. 18, 2006

(54) UNIVERSAL SEISMIC DATA ACQUISITION MODULE

(75) Inventor: Donald G. Chamberlain, Calgary (CA)

(73) Assignee: Geo-X Systems, Ltd., Calgary (CA)

( * ) Notice: Subject to any disclaimer, the term of this patent is extended or adjusted under 35 U.S.C. 154(b) by 297 days.

(21) Appl. No.: 10/437,112

(22) Filed: May 13, 2003

(65) Prior Publication Data

US 2003/0218936 A1 Nov. 27, 2003

Related U.S. Application Data

(60) Provisional application No. 60/383,407, filed on May 25, 2002.

(51) Int. Cl.
*H02G 3/08* (2006.01)
*H01V 367/14* (2006.01)

(52) U.S. Cl. .............................. 174/50; 174/37; 174/59; 367/14; 367/21; 361/600

(58) Field of Classification Search .................. 174/50, 174/53, 37, 50.5, 50.52, 52.1, 69, 65 R, 17 R, 174/58, 57, 135, 59; 220/3.2, 3.3, 3.4, 3.5, 220/3.6, 3.7, 3.8, 3.9, 4.02; 248/906; 439/535, 439/536; 361/724, 752, 600, 796; 367/21, 367/14

See application file for complete search history.

(56) References Cited

U.S. PATENT DOCUMENTS

| 3,910,448 | A | * | 10/1975 | Evans et al. ................... 174/50 |
| 4,493,063 | A | | 1/1985 | Tims et al. |
| 4,620,061 | A | * | 10/1986 | Appleton ..................... 220/3.8 |
| 4,725,992 | A | | 2/1988 | McNatt et al. |
| 5,550,787 | A | | 8/1996 | Rialan et al. |
| 5,627,798 | A | | 5/1997 | Siems et al. |
| 5,822,273 | A | | 10/1998 | Bary et al. |
| 6,430,106 | B1 | | 8/2002 | Staron |
| 6,727,429 | B1 | * | 4/2004 | Koessler ....................... 174/50 |
| 6,747,876 | B1 | * | 6/2004 | Strang ......................... 361/796 |
| 6,831,222 | B1 | * | 12/2004 | Pastuch ..................... 174/65 R |
| 6,831,227 | B1 | * | 12/2004 | Weise et al. ................... 174/58 |

\* cited by examiner

*Primary Examiner*—Angel R. Estrada
(74) *Attorney, Agent, or Firm*—W. Allen Marcontell

(57) ABSTRACT

A universal seismic data acquisition module includes independent environmental isolation chambers for essential signal processing circuitry and for cable connection unions. Cable connection unions are rapidly replaced without opening the main protective chamber. Different connector types required for the many data transmission cable designs needed to service a wide range of survey conditions are more easily accommodated than in conventional single chamber designs. The module is rugged and suitable for operating in a wide range of physical environments including lake or sea immersion to substantial water depths, desert, arctic and others. Need for investment in multiple module types for varying survey conditions is thereby reduced without compromising capacity.

12 Claims, 8 Drawing Sheets

UNIVERSAL SEISMIC DATA ACQUISITION MODULE

CROSS-REFERENCE TO RELATED APPLICATIONS

This application is related to U.S. Provisional Application Ser. No. 60/383,407 filed May 25, 2002 and claims the priority rights and privileges of that application provided under 35 USC §119.

STATEMENT REGARDING FEDERALLY SPONSORED RESEARCH OR DEVELOPMENT

Not Applicable.

BACKGROUND OF THE INVENTION

1. Field of the Invention

The present invention relates to seismic survey equipment. In particular, the invention relates to equipment assembly combinations and the logistics of equipment deployment.

2. Description of the Related Art

In principle, a seismic survey represents an analysis of the earth's geologic structure as indicated by seismic reflections from impedance discontinuities at lithologic interfaces. The analysis is influenced by seismic wave propagation velocities respective to the successively deeper geologic formations. A precisely-timed seismic source event, such as the ignition of buried explosives in a shallow borehole or a controlled mechanically-induced continuous vibration is launched at a precisely known location and time. Seismic wave reflections from this man-made seismic event are detected by a multiplicity of geophone or hydrophone sensor arrays located in a more-or-less orderly grid over the area of interest. A series of such seismic source events is initiated over the area of interest. The positions of the sensor arrays may be shifted to better receive the seismic reflections of interest prior to each successive seismic source event. The location of each sensor array and each source event is precisely mapped.

As a seismic wave from the timed event travels out from the source, reflections from that original seismic wave return to the surface where they are detected by the sensor arrays. The sensor arrays respond to the receipt of a wave with a corresponding analog electrical signal. These analog signals are received by data acquisition modules that digitize the analog signal stream for retransmission to a central recording unit. Among the significant data digitized by data acquisition modules is the amplitude or the strength of the reflected wave and the time lapse between the moment the event occurred and the moment the amplitude of the wave is received. For each seismic source event and each sensor array, amplitudesf are sampled over a time range typically from zero to five seconds, for an impulsive source such as the buried explosive; or zero to twenty seconds for the continuous vibratory source, for example. Samples are typically repeated every 2 milliseconds, thus generating from two to ten thousand samples per seismic source event per source array in representative cases for impulsive and vibratory sources.

In a single survey, there may be thousands of seismic source events each with thousands of seismic sensor arrays. Consequently, the data flow must be orderly and organized. For example, the data acquisition modules transmit digital sensor signal values in digital data packages containing a predetermined number of digital data bits. Each of these data packages may carry the identity of the specific sensor array from which the data originates and the time it was received by the sensor array in addition to the seismic signal amplitude value. The acquisition modules are programmed to transmit data packets respective to each sensor channel at a predetermined frequency. The variable data in a data packet represents an instantaneous snapshot of the analog signal flow from the sensor array channel. There may be numerous individual sensor arrays transmitting respective analog signals to the data acquisition module on the same communication channel.

Managing an orderly flow of this massive quantity of data to a central recording unit requires a plurality of geographically-distributed digital signal processing devices. The data acquisition modules convert the sensor array analog data to digital data and transmit the digital data packets along receiver lines or radio transmission channels. There may be numerous data acquisition modules transmitting data packets along a single receiver line or channel. Among the functions of each data acquisition module is data packet transmission timing respective to the flow of data packets from other data acquisition modules transmitting respective data packets along the same receiver line. Typically, two or more receiver lines connect with base line units that further coordinate the data packet flow of numerous additional base line units into a base transmission line for receipt by a central recording unit.

Seismic surveying is often carried out under extremely inhospitable conditions of heat or cold, tropics or arctic, land and sea, desert or swamp. The equipment must be robust and extremely reliable so that it may withstand the conditions imposed by the natural physical environment. It must be also be able to survive and continue to function during frequent episodes of deployment, pick-up, transportation and redeployment.

It has been the practice in the seismic industry to build special purpose adaptations for equipment suitable for a certain type of physical environment. When a seismic survey requires sensor arrays to be placed on the bottom of a body of water it may also be desirable for reasons of operational efficiency to place the seismic data acquisition modules in proximity to the arrays at the water bottom. Resistance to invasion by water by the modules and the connectors that join the cables to the modules is essential for successful operation in this sub-aqueous environment. Specially designed module packaging and cable connectors are widely used for placement at water depth in excess of a few meters. Occasionally, in spite of these efforts, the cable connector fails when the module is submerged, resulting in flooding of the internal chamber and destruction the essential electronic functionality.

In contrast, seismic surveys in dry environments may have no requirement for placement of modules and their connectors under water. A less pressure-resistant module packaging and type of cable connector is less costly to build and could be perfectly robust in this dryer physical environment. Therefore it is common practice to use different types of module packages and cable connectors in dry land operations as compared to those used in water bottom environments. Similarly, adaptations are made for other differing environments such as swamp, arctic, jungle, urban etc.

Another category of reasons for selecting different types of cables and connectors for different seismic projects relates to the need to modify the type of cable and number of conductors to meet the geophysical or economic objectives of the survey. Variable numbers of channels may be accommodated by the modules (from 1 to 8, e.g.) and use of this feature allows the operator to optimize the equipment configuration for different types of surveys, but full optimization may necessitate use of a different type of cable connector (and cable).

Cable connectors are integrated into the module packaging and may be replaced as required, either for reasons of equipment modification to meet survey requirements, or to replace faulty connectors. Module packages that have been available in the industry do require opening of the chamber containing the electronic assemblages in order for the cable connectors to be replaced. This is laborious and subjects the electronic assemblages to risk of physical damage and to risk of invasion by contaminants, potentially causing equipment failure. It would be desirable to be able to replace the cable connectors of the module package without having to expend labor to open the electronics chamber or to risk equipment failure.

For module packages that have been available in the industry, failure of cable connectors can cause invasion of modules by water and/or other contaminants, rendering the electronics inoperable. Electronics must be replaced in most such cases causing labor and spare parts costs to escalate as well as causing lost production time. Failure may be caused by high external pressure during submergence or it may have other causes, often relating to the physical impacts incurred in the frequent episodes of field deployment, transportation and re-deployment. It would be highly desirable to have a novel module design in which failure of the cable connector does not cause damage to the internal electronics.

Seismic surveys normally require a finite period of field activity for completion, ranging from a few days to a few months. The practitioner, usually a seismic contracting company, desires to use the same data acquisition equipment on each successive project to minimize his costs and maximize his profitability. However, because often the successive survey projects may be in widely differing physical environments and may have distinctly different geophysical requirements, he has been required to maintain multiple types of data acquisition modules and multiple types of cables and connectors, suffering idle capacity and capital value when the specialized equipment is not required.

Data acquisition modules of many prior art designs and types are available in the industry. However, these prior art designs have been known to suffer from such problems as cable connector failure, flooding of interior electronics when cable connectors physically fail, and inability to operate under the entire range of physical environments without replacement of the exterior housing of the module. The unique features of the present invention, are proposed to overcome these limitations.

It would thus be desirable to have a module package that could be used universally in all types of environments without the need to make modifications related to the environment of utilization. If this type of packaging were available the operator could avoid cost of modifying the modules or replacing modules when going from a water bottom survey to a desert survey, for example. Or he could avoid the cost of maintaining two complete sets of modules both of which would be underutilized.

The adaptation of the universal seismic data acquisition module would merely require the replacement of the cable connectors to prepare it for the next seismic project (in a different environment or with a different cable type from the prior project). Thus the cost of equipment inventory and labor to effect change of cable connectors would be favorably impacted, as would the amount of time required to mobilize for the subsequent project.

Such a seismic data acquisition module, adaptable to all physical working environments, with the capabilities desired for easy and safe change of cable connectors and for protection of the electronics in event of connector failure has been invented and is described in the subsequent sections of this disclosure.

SUMMARY OF THE INVENTION

The data acquisition module of the present invention comprises an environmentally isolated main chamber volume for the primary signal data processing circuits. This main chamber volume is enclosed by a substantial first housing structure. Opening access into the main chamber, at one or opposite ends, is closed and environmentally sealed by a removable first partition. Preferably, the first partition is an integral element of a second housing for an outer chamber volume therein. Opening access into the outer chamber volume is independent of the main chamber opening and is closed by a second partition such as a removable face plate.

Signal continuity from the main chamber circuitry into the outer chamber is carried by one or more dedicated conduits such as ribbon cable routed to traverse the first partition. Cable penetration apertures through the first partition structure between the main chamber and outer chamber are sealed by appropriate potting compounds.

Panel wall connectors, i.e. connection unions, for the seismic signal cable are mounted in the removable face plate. Connection adapters link the end connection elements of the ribbon cables to the interior connection joints of respective cable connection unions.

Although the face plate is easily removed from the extension body for mechanical access to the cable connection unions, the integrity of the main chamber seal remains undisturbed by the face plate removal. Such face plate removal allows convenient exchange of the cable-connected union and connection adapters transition connectors that link a desired style or model of seismic signal cable to the signal processing circuitry.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designated like or similar elements throughout.

DESCRIPTION OF THE PREFERRED EMBODIMENTS

Figure 1:
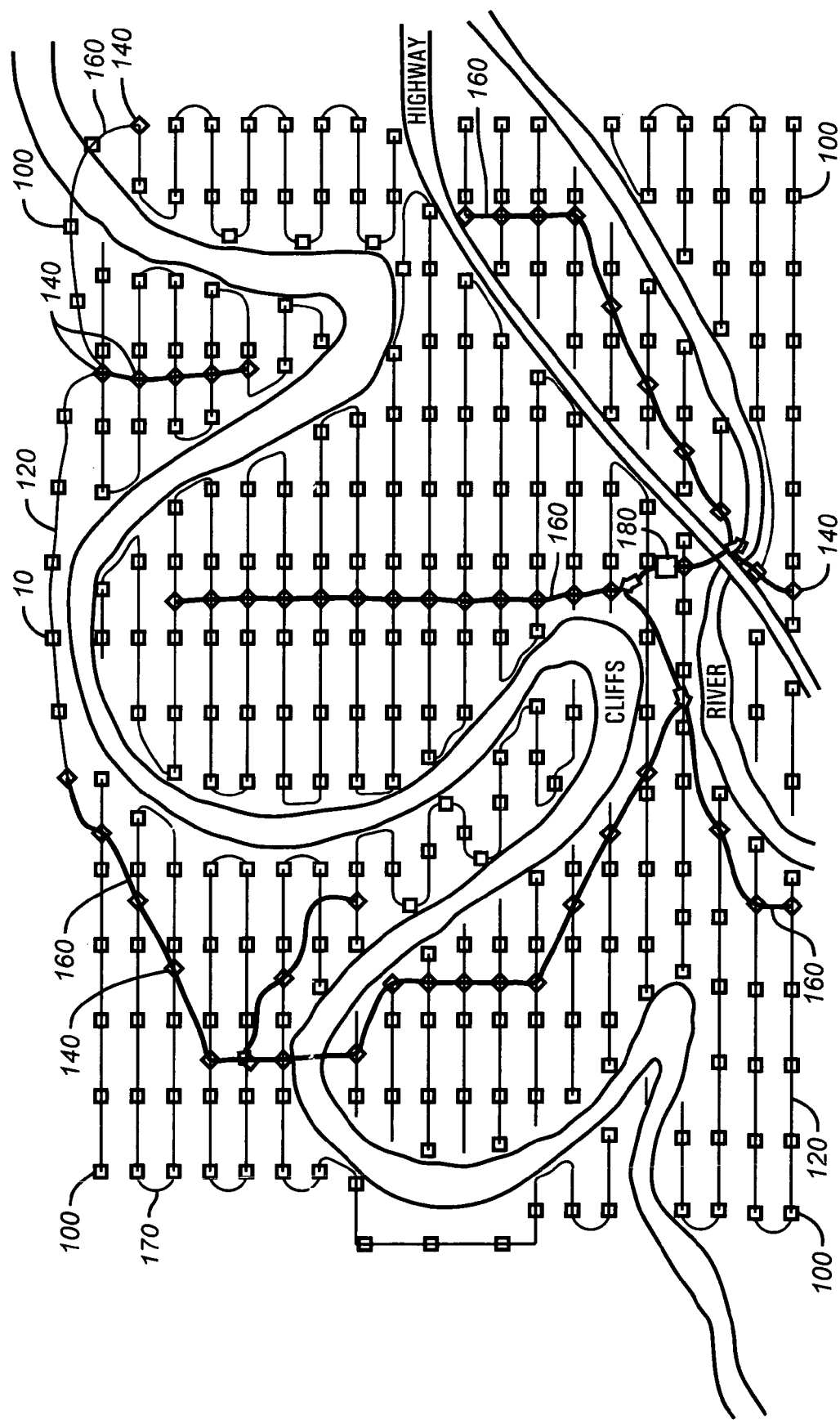
FIG. 1 is a schematic representation of a typical seismic survey field layout.

For environmental reference, a typical seismic survey grid is shown schematically by FIG. 1 to include a large number of remote seismic data acquisition modules (RAMs) 100 having orderly cable connections along receiver line cables 120 to respective line tap units 140. Line tap units (LTU) 140 connect receiver line cables 120 to base line cables 160. The base line cables 160 connect ultimately to the central recording unit (CRU) 180. Jumper cables 170 connect ends of receiver line cables 120 to form loops. RAMs 100 perform functions of collecting sensor array signals, digitizing these signals if they are not already digitized within the arrays, and transmitting the data toward the CRU 180. Also the RAMs 100 receive communications originated by the CRU 180 and by more remote RAMs 100 and relay this information to adjacent RAMs 100 or LTUs 140. The various cables and modules perform as a seismic communications network, and also as a seismic data acquisition system, according to the commands emanating from the CRU 180.

Alternatively radio or light wave communications may replace the conventional cables connecting the various modules shown in FIG. 1 so that cables are not required for communication yet are still required for connecting sensor arrays to the RAMs 100.

Seismic sources are actuated under control of the CRU 180 according to the dictates of the human operator. The various cables and modules, as well as the CRU, may be frequently repositioned during the course of the seismic survey. This necessitates frequent disconnection, transport and reconnection of cables to the RAMs 100 and LTUs 140. Moreover, portions or all of the survey area may be water-covered, even to depths in excess of 100 m, partially submerged or on wholly dry land. Therefore the operator wishes to use the most reliable and robust equipment available for each environmental circumstance presented. Hence, in a single survey, a variety of cable assemblies may be preferred.

Figure 2A:
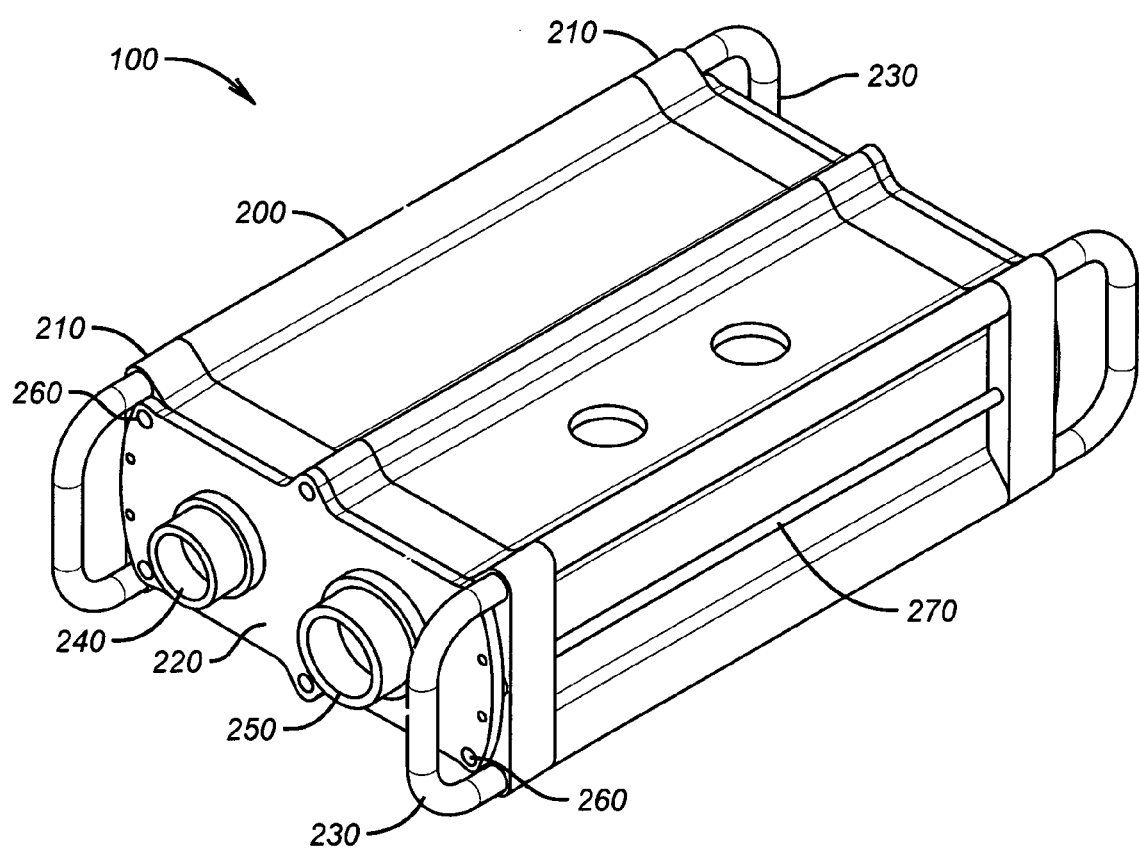
FIG. 2A is a view of a data_acquisition module (RAM) according to the present invention.

FIG. 2A shows a view of the data acquisition module (RAM 100) according to the present invention. The primary module housing 200 encloses and protects the critical data processing circuits such as the essential electronics that perform the seismic signal processing, digitization, communication and control functions. A receiver line cable connection union 250 provides a means of connecting the receiver line cable 120 to the RAM 100. A battery cable connection union 240 allows the battery power supply to be connected to the RAM 100. Two identical cable connection unions (240 and 250) are not visible in this view, but are directly opposite to the cable connectors shown, so that there are a total of four cable connection unions per RAM 100.

Thus two battery power supplies may be connected to the RAM 100, and two receiver line cables 120 may also be connected.

Two extension housings 210 are joined to the primary module housing 200. An access opening into each extension housing is covered by a face plate 220. Each face plate 220 holds two cable connectors, 240 and 250. Four interlocking bars 230 couple the face plates 220 and the extension housing 210 with the primary module housing 200. The interlocking bars are held in place by set screws. Two bar straps 270 also hold the two extension housings 210 to the primary module housing 200. Three environmentally sealed and protected chambers exist within the RAM 100, the primary electronics chamber within the primary module housing 200, and two smaller chambers, one in each of the extension housings 210. The primary module chamber is sealed off from the extension housing chambers.

Figure 2B:
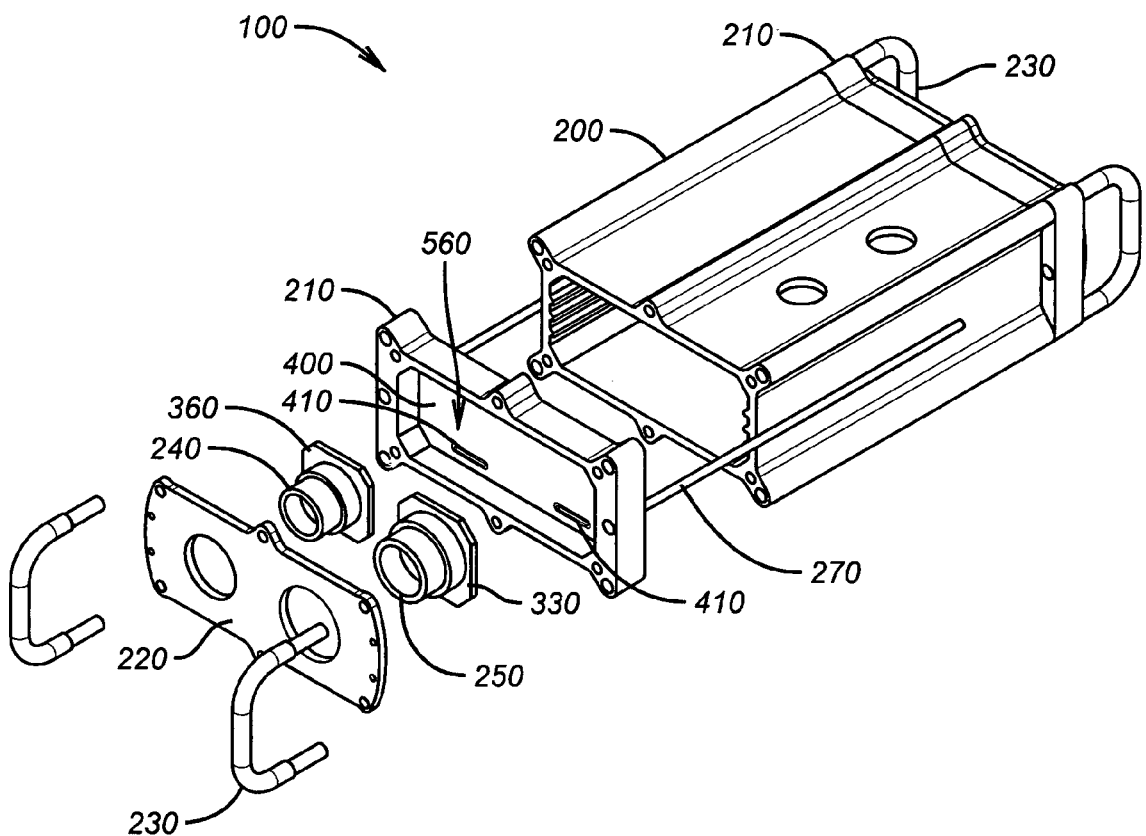
FIG. 2B is a view of a the components of the RAM ready for assembly.

FIG. 2B shows a view of the principle elements shown in FIG. 2A ready for assembly. The cable connection unions 240 and 250 have back plates 330 and 360 which will be in the interior of the extension housing chamber after assembly. A view into the interior of the primary module housing 200 is shown.

Figure 3A:
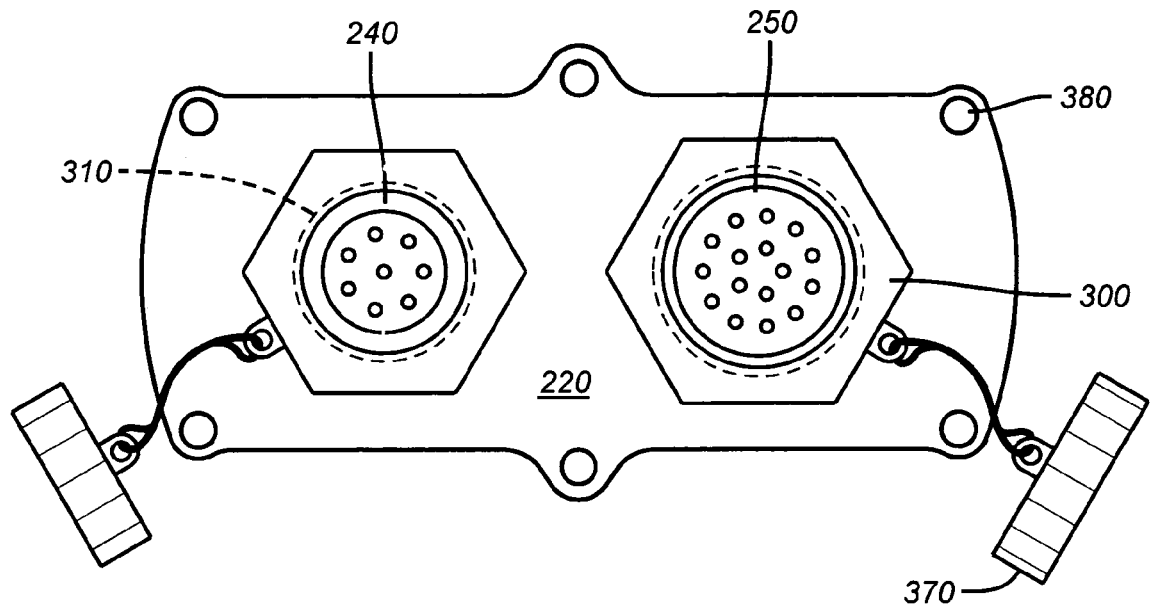
FIG. 3A is a schematic drawing of the front of the face plate assembly of the RAM.
Figure 3B:
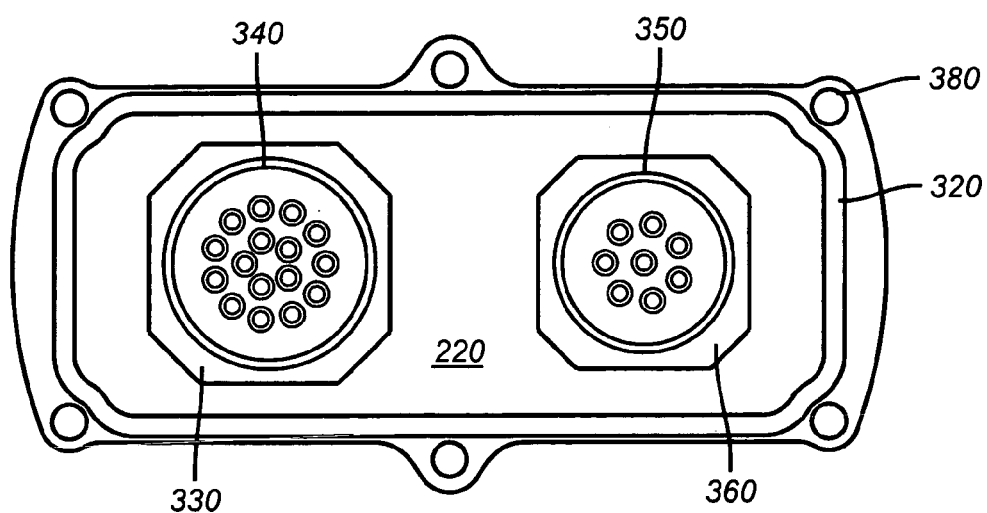
FIG. 3B is a schematic drawing of the back of the face plate assembly of the RAM.

The face plate assembly 220 is shown, front and back, in FIG. 3A and FIG. 3B. In the front view, the two hex nuts 300 that hold down the cable connection unions 240 and 250 are shown. Under each hex nut 300 is an O-ring 310, sealing off the portal. Six holes 380 distributed around the face plate 220 periphery receive Allen head cap screws 260 (FIG. 2A) to fasten the face plate assembly to the extension housing 210. These bolts also pass into the primary module housing 200, securing the three structural elements together e.g. the face plate 220, the extension housing 210, and primary module housing 200. Threaded dust covers 370 are turned over the external sockets of the unions 340 and 350 when not connected to cables.

The back or interior view of the face plate assembly in FIG. 3B shows the interior side of the battery cable connector 350 and the interior side of the receiver line cable connector 340. Conductor pins protrude into the interior of the chamber from the connector bodies.

An O-ring and seat 320 on the interior of the face plate assembly 220 provides the means of environmentally sealing off the extension housing chamber.

Figure 4A:
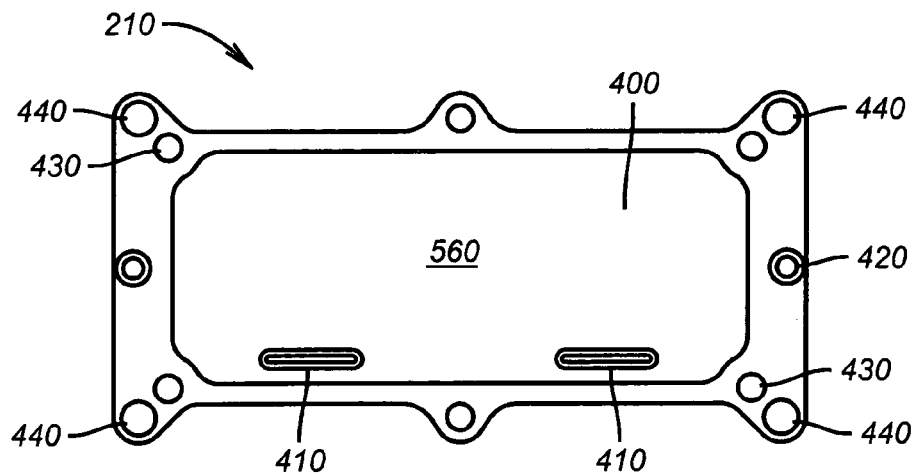
FIG. 4A is a schematic representation of the front view of the extension housing assembly.
Figure 4C:
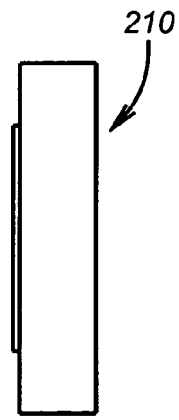
FIG. 4C is a schematic drawing of the side view of the extension housing assembly.
Figure 4B:
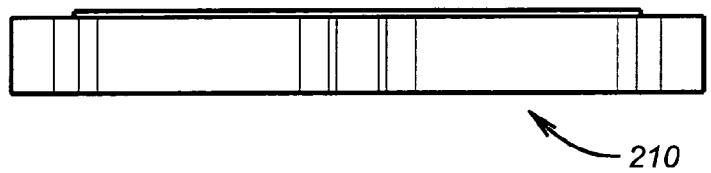
FIG. 4B is a schematic drawing of the top view of the extension housing assembly.
Figure 4D:
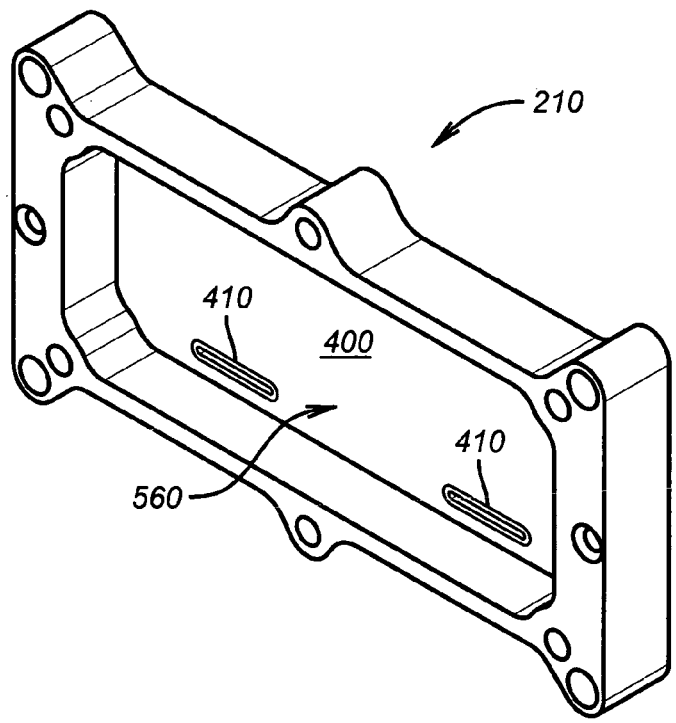
FIG. 4D is a schematic drawing of the 3D view of the extension housing assembly.

FIG. 4A is a schematic drawing of the front of the extension housing 210. The back wall 400 of the extension housing 210 is penetrated by two ribbon cable slots 410. Two holes 420 for bar strap bolts 270 are provided and four holes 440 for interlocking bars 230 are visible. Six holes 430 for face plate locking bolts 260 are also shown. Top and side views of the extension housing 210 are shown in FIG. 4B and FIG. 4C. A "3D" isometric view is also included as FIG. 4D. Preferably, the back wall 400 of the extension housing 210 is integral with the extension housing walls to define the volumetric space respective to the extension housing chamber 560. When the face plate 220 is fastened to the extension housing 210, the interior extension housing chamber 560 is open only through the two ribbon cable slots 410. These are also sealed when the two ribbon cables 510 have been installed as shown in the next figure.

Figure 5:
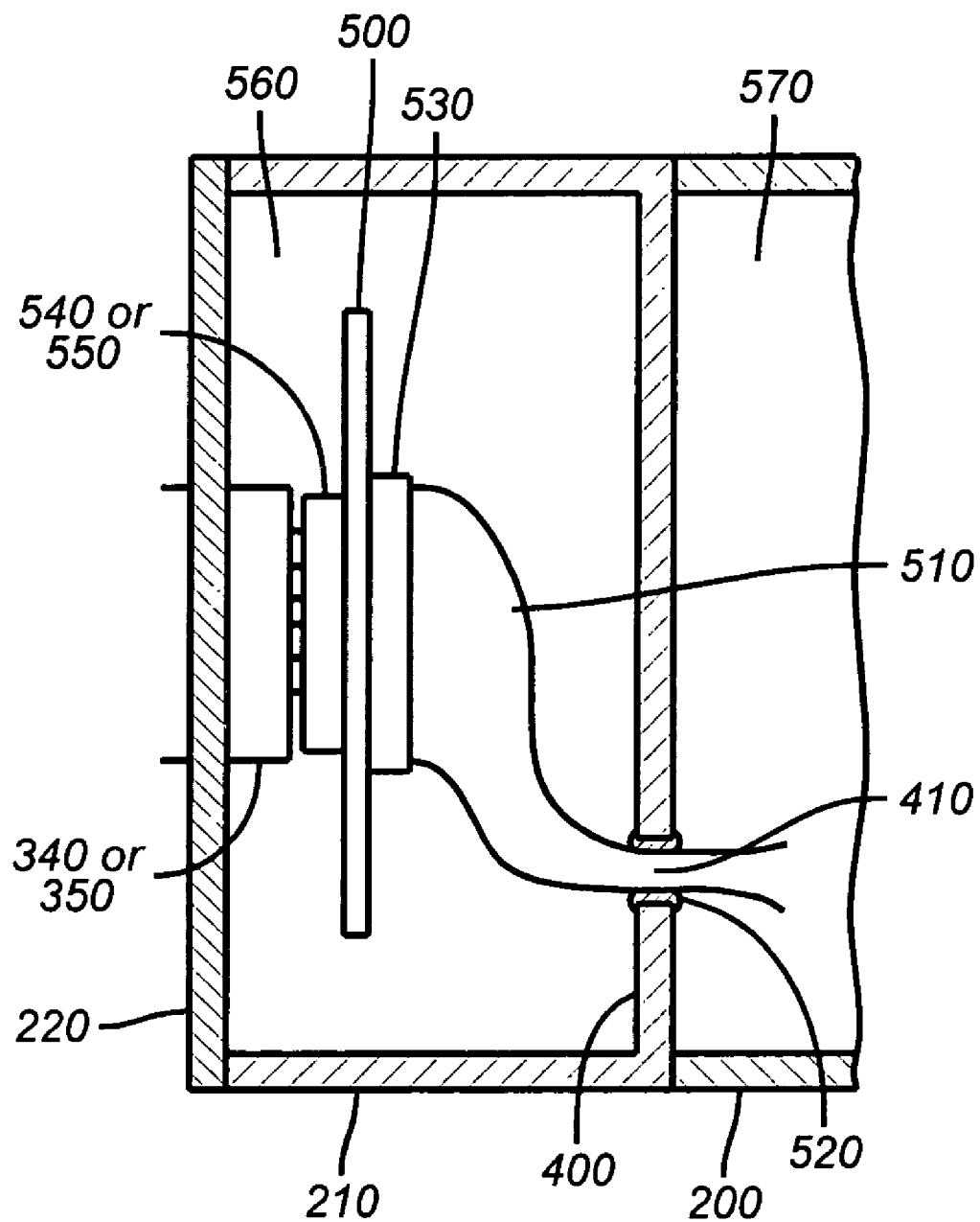
FIG. 5 is a schematic drawing showing elements within the extension housing that conduct signal and power from the internal cable connectors to the interior of the primary module housing.

FIG. 5 is a schematic drawing of a side view of the extension housing 210 with the two ribbon cables 510 installed. The ribbon cable connection adapter 500 (essentially a PCB board with no electronic functions) carries a standard ribbon cable connector 530 on its interior side into which the ribbon cable 510 connects. On its exterior side, the connection adapter 500 carries the socket for cable connector pins 540 and 550 (8 and 16 pin connectors respectively, for example). The cable connector pins protrude from the back of the battery cable connector 350 and the receiver line cable connector 340. The two ribbon cables 510 pass respectively through the two slots 410 into the interior of the primary housing protective chamber 570. These slots are sealed with a potting compound 520 such as the commercially available "liquid glass", to maintain the environmental isolation integrity of the primary housing protective chamber 570.

This potting compound 520, when used in the slots 410, is able to withstand hydrostatic pressure in excess of that of a 100 m column of water. Thus it can protect the primary housing protective chamber 570 from intrusion in the event the environment of the extension housing chamber 560 is invaded.

Figure 6A:
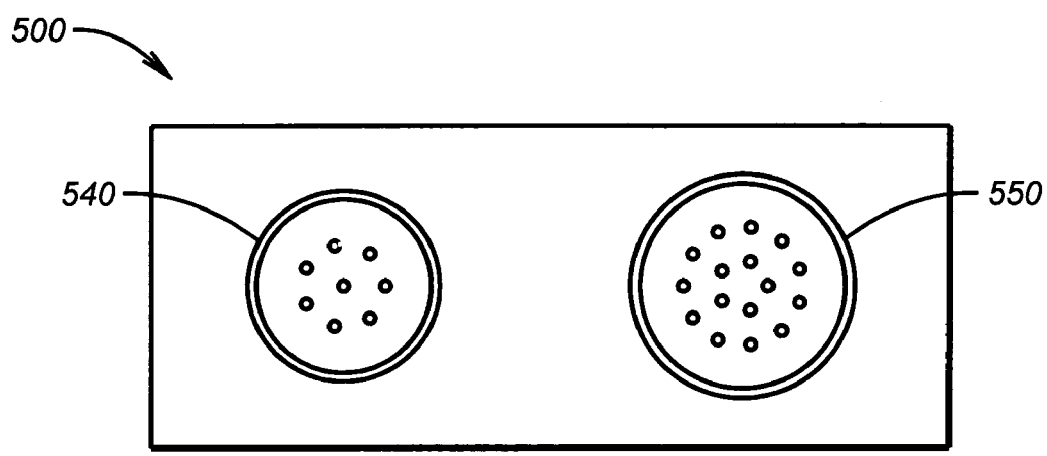
FIG. 6A is a schematic drawing of the front of the ribbon cable adapter.

FIG. 6A provides a schematic drawing of the front of the ribbon cable connection adapter 500 showing the socket for 8-pin connection 540 and the socket for the 16-pin connection 550. These plug into the back of the battery and receiver line cable connectors, 340 and 350 respectively.

Figure 6B:
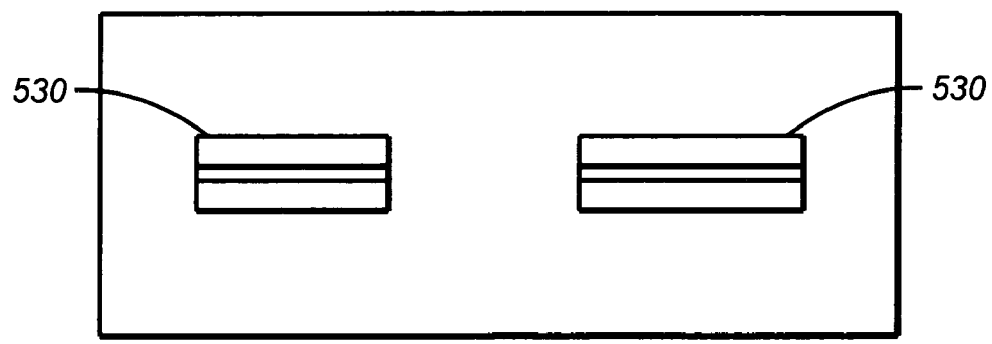
FIG. 6B is a schematic drawing of the back of the ribbon cable adapter.

FIG. 6B shows the back of the ribbon cable connection adapter 500. Two standard ribbon cable connectors 530 are installed on this side. Conductors are wired through the connection adapter assembly to re-arrange them from a circular to a linear array.

No electronic (only electrical) functionality is conducted within the interior of the extension housing protective chamber 560 as can be ascertained from the figures provided. Rupture of one of the connectors or failure of an O-ring 310 that seals the connector portal may allow water or other contaminants to enter the chamber. This event can cause no damage to the RAM 100 electronics as they are contained entirely within the primary housing protective chamber 570.

Should a connector fail in this manner, causing invasion of the extension housing chamber 560, the connector can be easily replaced without opening the primary module protective chamber 570. A necessity for opening the electronics chamber just to change a cable connector, is to be avoided because the action risks contamination and damage to the essential electronics.

The process of replacing a damaged cable connection union (240 or 250) is as follows:
1. The hex nut 300 is loosened.
2. The six face plate locking bolts 260 are removed using an Allen wrench.
3. The face plate 220 is removed.
4. The socket 540 or 550 on the ribbon cable connection adapter 500 is de-coupled from the back of the cable connector 340 or 350, leaving the connection adapter in place.
5. The faulty cable connection union 240 or 250 and O-ring 310 are removed from the face plate 220.
6. The face plate and extension housing protective chamber 560 are cleaned of all water and other contaminants.
7. The new O-ring 310 is properly installed on the back of the face plate 220.
8. The new cable connection union 240 or 250 is installed on the face plate 220.
9. The face plate 220 is fastened to the extension housing 210 using the six locking bolts 260.
10. The hex nut 300 is fully tightened.

When it is required to conduct inspection or repairs on the electronics assemblies that reside within the primary housing protective chamber 570, that chamber can be readily opened by removing one or both of the extension housings 210.

The cable connection unions 240 and 250 may be of various types available within the industry. Such cable connection unions may be constructed to withstand only modest submergence in water, to say a maximum depth of 5 meters. Cable connection unions may also be constructed more ruggedly so as to withstand submergence to depths of 100 meters or more. These deep-water connection unions are generally more bulky and more expensive. Therefore when an operator is working in primarily dry land environments, he will choose the lighter, dry-land type of connection union. However, he may wish to convert his data acquisition system to perform a deep water seismic survey after working in dry land conditions. He is able to use the RAM 100 of the present invention for both types of environments by simply changing the cables and compatible connection unions 240 and 250 to a different type that is suitable for the environment of the new project.

The RAM 100 of the present invention is designed so that the primary housing protective chamber 570 and the two extension housing chambers 560 are able to withstand water pressures in excess of 100 m, yet the RAM 100 is sufficiently small that it is convenient for all types of applications, even when all equipment must be man-transportable as on certain mountain and jungle seismic projects. Prior art seismic data acquisition modules designed for submersion in water of depths greater than 10 m are too bulky for transportation by man, and are carried by boats or other vehicles. Thus, there are generally two types of modules, one type that is light weight for land jobs, and another type that is bulkier and able to withstand submergence pressures, for ocean-bottom operations. The RAM 100 is sufficiently small for man transportability yet well able to withstand water pressure in excess of that at 100 m depth, so it does away with the need to maintain inventory of two different types of modules. This reduces the capital costs and greatly increases flexibility in operations for the seismic operator.

Figure 7:
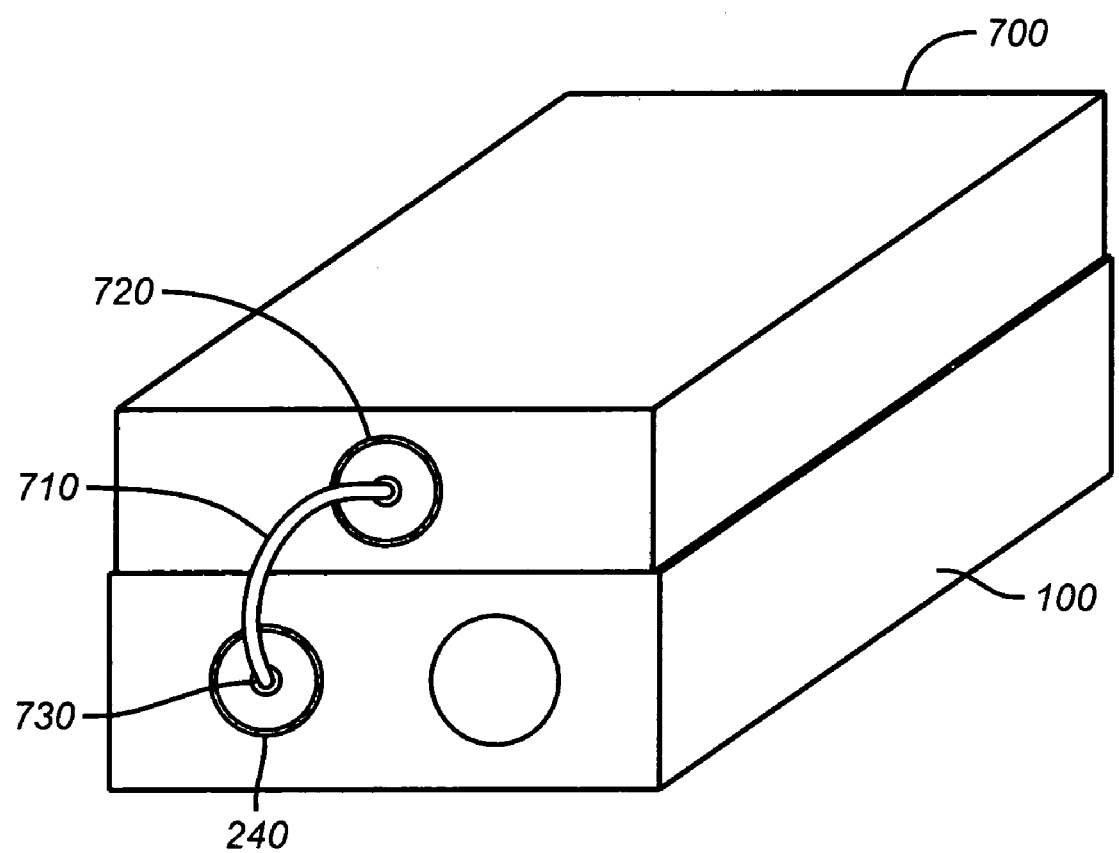
FIG. 7 is a schematic drawing of the RAM with battery power supply.

Battery power for the RAM 100 is provided via the battery cable and battery cable connector 240. Light weight high energy battery systems such as lithium ion batteries are packaged for use in the same range of difficult physical environments as the RAM 100 itself. FIG. 7 shows a schematic drawing of a typical configuration of battery power unit 700 coupled with the RAM 100. The battery cable 710 connects the power unit 700 via the connector 720 to the battery cable connector 240 of the RAM 100 via the connector 730. The very short cable 710 may also be permanently affixed to the battery power supply 700 at battery cable connection point 720.

Two such battery power units 700, one on top and one on the bottom of the RAM 100, facing opposite ways and connecting to the opposing battery cable connection unions 240 (one on each side of the RAM 100) may be used.

The battery power unit 700 is built to withstand the same range of environmental conditions as the RAM 100, including submersion to 100 m or greater depth. Because it is light in weight, it is also man transportable for jungle or mountain operations.

Therefore, the combined unit with power supply is able to work under the entire range of desired physical environments.

The structural elements of the protective chambers of the battery power supply unit 700, the primary housing module and the two extension housings are fabricated of extruded aluminum, preferably, to provide an optimum combination of light weight, strength, durability and cost to manufacture.

Because of its combined advantages the current invention as embodied in the RAM 100 with attached battery power supply 700 is superior to all known existing equivalent seismic data acquisition modules in respect to avoiding damage in event of cable connection union failure, ease of replacement of cable connection unions, avoidance of damage while replacing cable connection unions, protection and avoidance of risk to the electronic assemblages during maintenance of the cable connection unions and also, the capability of working over the entire range of desired physical environments with only a change of cable connection unions, not requiring a change of module packages for work in deeply submerged environments, and manually transportable.

Although my invention has been described in terms of specified embodiments which are set froth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. An enclosure for environmentally isolating seismic signal processing circuits, said enclosure comprising an assembly of first and second housings for respective chambers, a first chamber of said first housing having internal access through a first environmental partition that may be selectively detached repeatedly from said first housing, a second chamber respective to said second housing contiguously adjacent said first partition, said first partition being a structurally integral element of said second housing, said second chamber having internal access through a second environmental partition that is selectively detachable from said second housing, a first signal conduit traversing said first partition for operative connection at one end with signal processing circuitry within said first chamber and with a first conduit connector at an opposite end, and a first conduit connection union traversing said second partition, said first connection union having an inside connector compatible with said first conduit connector and an outside conduit connector compatible with a seismic signal conductor cable.

2. An enclosure for environmentally isolating seismic signal processing circuits as described by claim 1 wherein said first signal conduit traverses said first environmental partition through an environmentally sealed aperture.

3. An enclosure for environmentally isolating seismic signal processing circuits as described by claim 1 wherein said enclosure assembly further comprises an independent connection adapter having first and second connection joints, said first connection joint being compatible with said first conduit connector and said second connection joint being compatible with said inside connector.

4. An enclosure for environmentally isolating seismic signal processing circuits as described by claim 1 wherein said assembly comprises a plurality of first signal conduits traversing said first partition for connection with a corresponding plurality of conduit connection unions.

5. An enclosure for environmentally isolating seismic signal processing circuits as described by claim 4 wherein said assembly comprises a plurality of first environmental partitions and corresponding second housings.

6. An assembly for processing seismic signal data comprising:
(a) a first housing for a first chamber said first chamber being disposed for environmentally isolating signal data processing circuitry within said first chamber;
(b) a second housing having a second environmentally isolated chamber;
(c) a first closure partition that is repeatably detachable from said first housing and disposed to separate said first and second environmentally isolated chambers;
(d) a second closure partition that is repeatably detachable from said second housing for selective access into said second chamber;
(e) a first signal conduit traversing said first closure partition, said first conduit having a first terminus within said first chamber and a second terminus within said second chamber, said first terminus connected to said signal processing circuitry and said second terminus having a first conduit connector; and,
(f) a cable connection union bridging said second closure partition to transfer signal continuity between inside and outside connection joints, said inside connection joint having connection compatibility with said first conduit connector.

7. An assembly for processing seismic signal data as described by claim 6 having a plurality of second housings and respective second chambers.

8. An assembly for processing seismic signal data as described by claim 6 having a plurality of first signal conduits traversing said first closure partition.

9. An assembly for processing seismic signal data as described by claim 8 having a plurality of cable connection unions bridging said second closure partition.

10. An assembly for processing seismic signal data as described by claim 6 wherein said assembly further comprises an independent connection adapter having first and second conduit connection joints, said first connection joint being compatible with said first conduit connector and said second connection joint being compatible with said inside connection joint.

11. An enclosure for environmentally isolating seismic signal processing circuits, said enclosure comprising an assembly of first and second housings for respective chambers, said chambers being separated by a first environmental partition, a first signal conduit traversing said partition for operative connection at one end with signal processing circuitry within said first chamber and with a first conduit connector at an opposite end, a removable second environmental partition for covering an access opening into said second chamber, a first conduit connection union that traverses said second partition and is conveniently detached from said second partition for replacement, said first connection union having an inside connector compatible with said first conduit connector and an outside conduit connector compatible with a seismic signal conductor cable.

12. An enclosure for environmentally isolating seismic signal processing circuits, said enclosure comprising an assembly of first and second housings for respective first and second chambers, said second housing having an integral first partition element environmentally separating said first and second chambers, a first signal conduit traversing said first partition for operative connection at one end with signal processing circuitry within said first chamber and with a first conduit connector at an opposite end, a removable second environmental partition for covering an access opening into said second chamber, a first conduit connection union traversing said second partition, said first connection union having an inside connector compatible with said first conduit connector and an outside conduit connector compatible with a seismic signal conductor cable.

* * * * *